(12) United States Patent
Ecob

(10) Patent No.: US 8,640,859 B2
(45) Date of Patent: Feb. 4, 2014

(54) CONVEYOR PALLET AND GUIDING SYSTEM

(75) Inventor: Robert Donald Ecob, Cambridge (CA)

(73) Assignee: ATS Automation Tooling Systems Inc., Cambridge, ON. (CA)

( * ) Notice: Subject to any disclaimer, the term of this patent is extended or adjusted under 35 U.S.C. 154(b) by 252 days.

(21) Appl. No.: 13/075,644

(22) Filed: Mar. 30, 2011

(65) Prior Publication Data

US 2011/0240443 A1    Oct. 6, 2011

Related U.S. Application Data

(60) Provisional application No. 61/318,938, filed on Mar. 30, 2010.

(51) Int. Cl.
*B65G 17/00* (2006.01)
*B65G 17/18* (2006.01)

(52) U.S. Cl.
USPC .................. 198/793; 198/800; 198/836.1

(58) Field of Classification Search
USPC ............ 198/465.2, 793, 800, 836.1, 837, 841
See application file for complete search history.

(56) References Cited

U.S. PATENT DOCUMENTS

| | | | |
|---|---|---|---|
| 3,717,102 A | 2/1973 | Lott et al. | |
| 3,738,478 A * | 6/1973 | Tourtellotte | 198/851 |
| 4,393,999 A | 7/1983 | Forshee | |
| 4,402,393 A * | 9/1983 | Kent | 198/345.3 |
| 4,687,091 A | 8/1987 | Sticht | |
| 5,372,240 A * | 12/1994 | Weskamp | 198/465.1 |
| 5,435,429 A | 7/1995 | Van Den Goor | |
| 5,857,413 A | 1/1999 | Ward | |
| 6,191,507 B1 | 2/2001 | Peltier et al. | |
| 6,779,652 B2 * | 8/2004 | Baier et al. | 198/831 |
| 6,968,943 B2 * | 11/2005 | Kilby et al. | 198/852 |
| 7,802,676 B2 * | 9/2010 | Guldenfels et al. | 198/853 |
| 2008/0149458 A1 | 6/2008 | Ehlert | |
| 2009/0199745 A1 | 8/2009 | Wathne et al. | |

OTHER PUBLICATIONS

Canadian Intellectual Property Office, Form PCT/ISA/220—International Search Report dated Jul. 6, 2011, International Appln No. PCT/CA2011/050166, Quebec, Canada.
Canadian Intellectual Property Office, Form PCT/ISA/237—Written Opinion of the International Searching Authority dated Jul. 6, 2011, International Appln No. PCT/CA2011/050166, Quebec, Canada.
European Patent Office, Extended European Search Report for EP Appln No. 11761886.8, Nov. 16, 2012.

* cited by examiner

*Primary Examiner* — Leslie A Nicholson, III
(74) *Attorney, Agent, or Firm* — Borden Ladner Gervais LLP; Neil Henderson

(57) ABSTRACT

A conveyor system pallet is provided, having: a pallet body; and a guiding system operatively attached to the pallet body and designed to abut against at least one side rail of a conveyor system, the guiding system including: a plurality of first directional guides; and a plurality of second directional guides oriented approximately orthogonally to the first directional guides. A further guiding system for a conveyor pallet is provided, having: a plurality of first directional guides having: a plurality of guides designed to abut against a first side rail of the conveyor system; and a plurality of guides designed to abut against a second side rail located above the first side rail of the conveyor system; and a plurality of second directional guides designed to engage an underside of the first side rail.

11 Claims, 3 Drawing Sheets

CONVEYOR PALLET AND GUIDING SYSTEM

RELATED APPLICATIONS

This application claims priority from U.S. Provisional Application No. 61/318,938 filed Mar. 30, 2010, which is hereby incorporated by reference.

FIELD

The present document relates generally to conveyor systems. More particularly, the present document relates to a conveyor pallet and guiding system.

BACKGROUND

In a conveyor system, conveyor pallets are used to transport goods that cannot be transported directly on the conveyor system itself. These products could require a pallet because of their shape or size or due to their sensitivity, fragility or inability to be positionally stable.

Conveyor systems may have straight sections, curved sections, diverts, merging mechanisms and the like and may run at varying speeds. As such, the pallet may be subject to sudden acceleration, deceleration or radial forces. If conveying an unstable or off-centered product these forces may cause the product to topple or become dislodged or uncontrollable, which may result in damaging the product, may require shutting down the conveyor system or may reduce the ability to be able to orient the product in a controlled manner.

Conventional pallets are generally simple platforms that may have some fixtures or mechanisms for supporting a product thereon but can still be quite unstable, particularly when undergoing acceleration, deceleration or radial forces.

Thus, there is a need for a pallet that addresses at least some of the challenges of greater stability while supporting a potentially unstable product, for example, a top heavy or an off-center product.

SUMMARY

In the embodiments herein, a pallet is described which includes a guiding system to direct and stabilize the pallet as the pallet is maneuvered along a conveyor system and is subjected to radial or linear de-stabilizing loads. The embodiments herein provide a pallet with a body that may be injection molded due to cost effectiveness, high strength characteristics with low mass, and avoidance of expensive machining. Various features described below are intended to reduce the chance that the pallet will tip when accelerated, decelerated or subjected to radial and linear inertial loads, especially when unstable loads are present.

In one aspect, there is provided a stable conveyor pallet comprising: a plurality of guides wherein at least one guide is vertically oriented and at least one guide is horizontally oriented. It will be understood that the terms vertical and horizontal are used for convenience but generally represent directions that are approximately perpendicular to each other in a reference frame. The pallet is intended to have sufficient guides that allow the pallet to be stabilized in multiple dimensions as the pallet moves along a conveyor system. In a particular case, a plurality of vertically oriented guides can be provided along edges of the pallet to abut a conveyor edge guide and a plurality of horizontal guides can be provided on either side of the pallet to abut the conveyor edge guide or a second conveyor edge guide from an approximately perpendicular direction in relation the plurality of vertical guides. The provision of a plurality of guides in each of two directions is intended to provide stability even during changes in acceleration or in turning corners. In a particular case, the plurality of guides (either vertical or horizontal) may be spaced around the pallet such that the pallet is stabilized at least at the corners of the pallet but spread apart in such a way that the pallet can turn corners without jamming.

According to an aspect herein, there is provided a conveyor system pallet comprising: a plurality of first directional guides and a plurality of second directional guides designed to engage a side rail of a conveyor system. The first and second directional guides are oriented approximately orthogonally.

In a particular case, the plurality of first directional guides may be dual height vertical guides to allow interaction With two levels of conveyor system edge guide rail during turns or transitions. In this case, the dual height vertical guides may be located at approximately each corner of the conveyor system pallet. In some cases, the vertically oriented guides may further comprise a center guide for additional control during transitions or corners.

In another case, the plurality of second directional guides may be horizontally oriented guides and be located on the sides of the conveyor system pallet and are designed to engage an underside of a side or edge guide rail of the conveyor system. The first and second directional guides may be rollers or bearings, including steel bearings.

In another particular case, the pallet may further include at least one wear plate attached to a bottom side of the pallet wherein the wear plate includes a plurality of mounting apertures designed to engage a pallet fixture. In some cases, the wear plate may also or alternately include positioning apertures designed to engage shot pins to position the pallet accurately. The pallet itself may also include one or more mounting or positioning apertures.

In another case, the pallet may further include bumpers located at a front and back end of the pallet to protect against impacts between pallets. The pallet may also include a directional indicator that ensures pallets are placed on the conveyor in a correct orientation, for example, a plurality of vertical ribs on either side of the pallet, wherein one side of the pallet contains a larger number of vertical ribs than the other side.

In another case, the top side of the conveyor system pallet may further include at least one depression adapted to receive a clamping mechanism that is intended to provide a surface for gripping and manipulation of the pallet.

According to another aspect herein, there is provided a guiding system for a conveyor system pallet comprising: a plurality of vertically oriented guides designed to engage a side rail of a conveyor system, the vertically oriented guides comprising a plurality of dual height vertical guides and a center guide; and a plurality of horizontally oriented guides designed to engage an underside of the side rail of the conveyor system.

Other aspects and features will become apparent to those ordinarily skilled in the art upon review of the following description of specific embodiments in conjunction with the accompanying figures.

BRIEF DESCRIPTION OF FIGURES

Embodiments will now be described, by way of example only, with reference to the attached Figures, wherein.

DETAILED DESCRIPTION

In one aspect herein, a conveyor pallet is provided including a guiding system of first and second directional guides intended to direct and stabilize the conveyor pallet. These directional guides may have the further benefit of reducing pallet tipping on accelerations, decelerations or subjected to radial and linear inertial loads, especially when carrying unstable products or loads, for example, those with a high or out-of-balance center of gravity.

Figure 1:
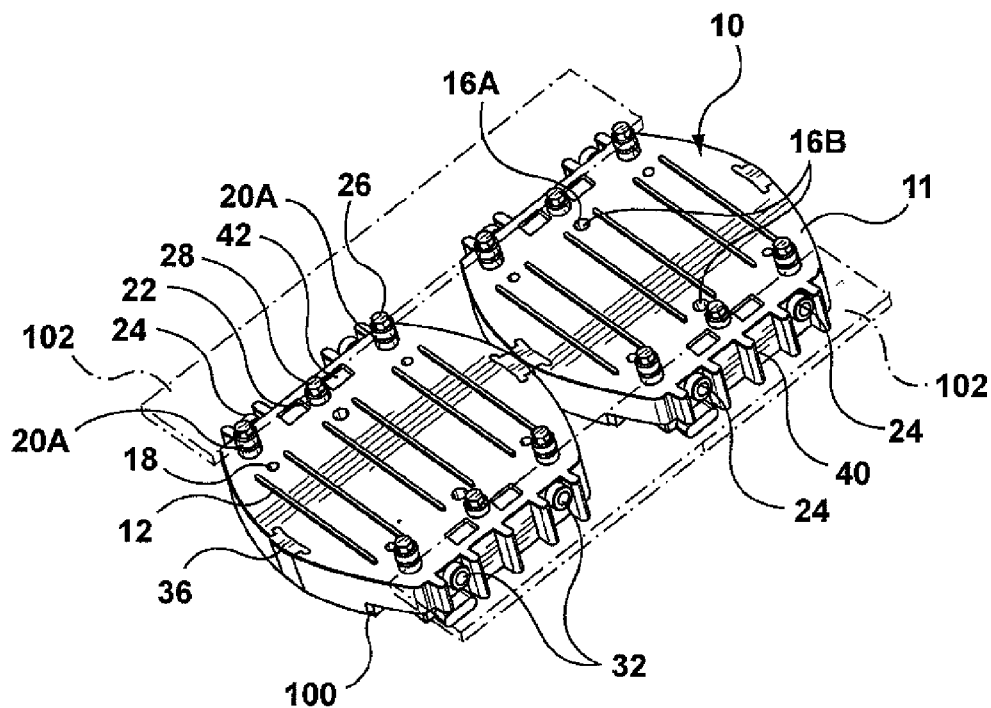
FIG. 1 illustrates a perspective top view of two pallets according to one embodiment.
Figure 2:
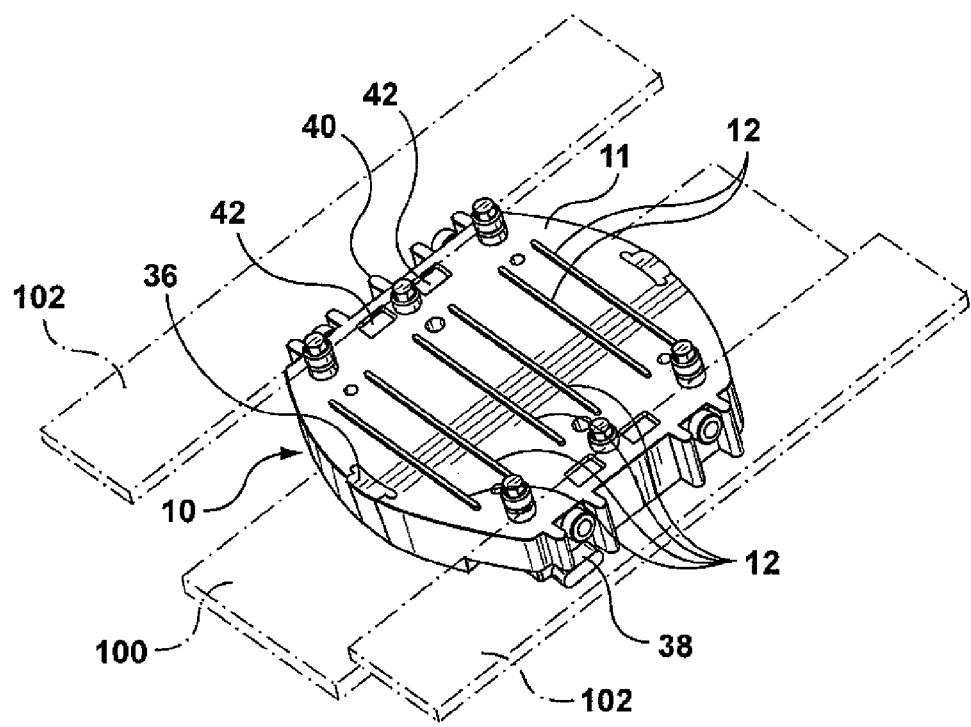
FIG. 2 illustrates a perspective top view of a single pallet.

FIG. 1 illustrates a top-rear perspective view of two pallets (10) on a conveyor system (100), while FIG. 2 shows a top-front perspective view of one pallet (10). The pallet (10) has a body (11) that may be formed in roughly an ellipsoid or parallelepiped shape. In the embodiment shown, the pallet body (11) has ends oriented in the direction of travel of the pallet (10) that are radially profiled and has sides that are substantially straight. The body (11) of the pallet (10) may be machined from billet stock, injection-molded, cast or compression molded. The pallets (10) illustrated in FIGS. 1 to 5 are shown as injection molded from an engineering resin. The pallet (10) may be assembled with injection molded engineering resin components that can be tooled and produced at lower cost than traditional machined fixtures. The pallet (10) may have a plurality of separate datuming features, as described below, that may be formed, for example, within an injection mold. The datuming features are intended to assist with accuracy of placement of parts and repeated placement and control of parts being conveyed.

Each pallet (10) has a plurality of ribs (12) that may be molded as part of the top of the body (11) of the pallet (10). The ribs (12) may be precision face-machined for control of height, parallelism and planarity. In the case of molded and cast piece, the ribs (12) may remove the risk of warping inherent to the manufacturing process. For medical or food grade use, the ribs (12) may provide a gap for a compliant gasket, if desired, to eliminate entrapment voids for bacterial growth or particulate accumulation.

Figure 3:
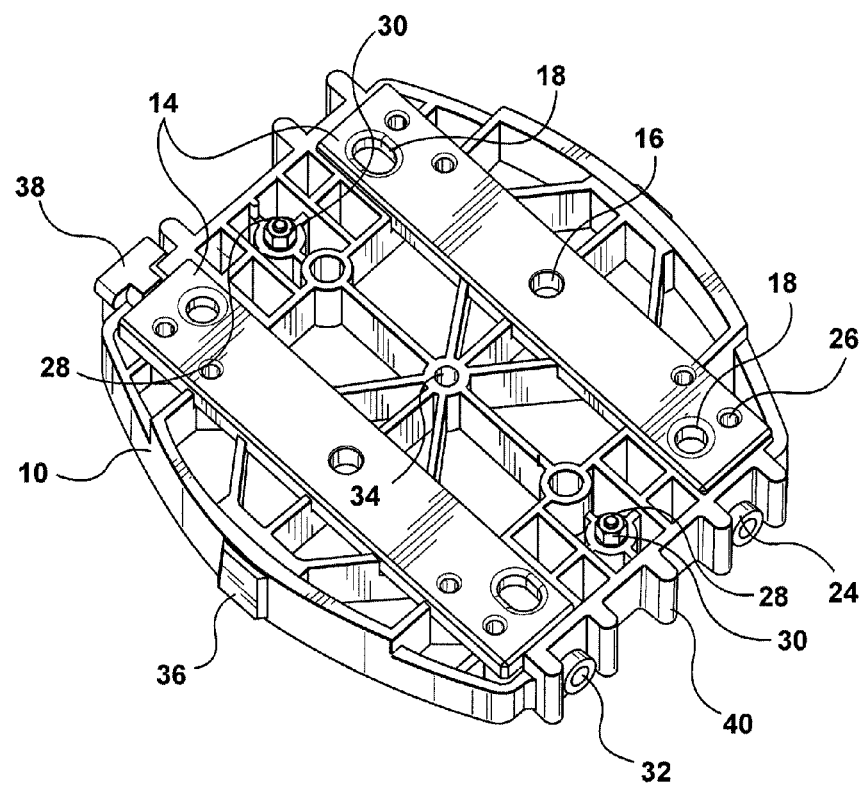
FIG. 3 illustrates a perspective view of the underside of a pallet.
Figure 4:
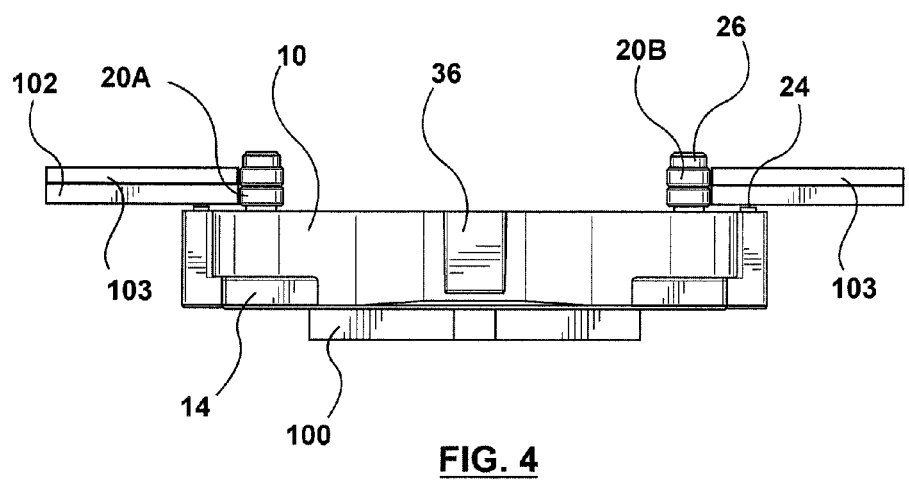
FIG. 4 illustrates a front view of a pallet.
Figure 5:
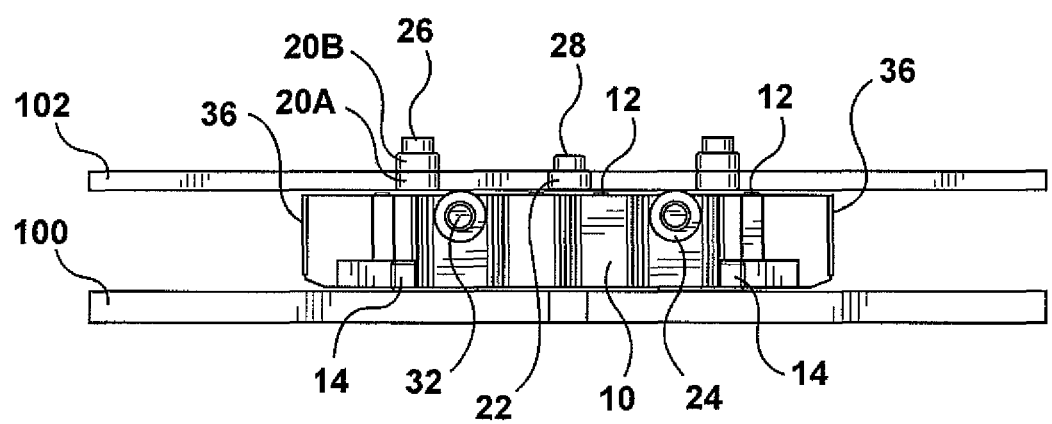
FIG. 5 illustrates a side view of a pallet.

The underside of the pallet (10) is shown in FIG. 3. Two wear plates (14) with a plurality of datuming features, including positioning apertures (16A and 16B) and mounting apertures (18), are visible from this angle. The wear plates (14) are intended to be wear resistant and, if necessary, corrosion resistant. The wear plates (14) may be heat-treated and may add to the base mass, which may provide precision edges for conveyor system stops. These plates (14) may be stainless steel where required for medical or food grade applications. The ribs (12) may be designed to be at a fixed height from the wear plates (14).

Although two wear plates (14) are shown in FIG. 3, the wear plate could be mounted as a single wear plate or a plurality of smaller wear plates could be used and oriented as required for stability.

The guiding system for the pallet (10) may include of a plurality of directional guides and, as shown in FIGS. 1 to 5, may be first directional guides, which may be vertically oriented guides and second directional guides, which may be horizontally oriented guides. It will be understood that the terms vertical and horizontal are used for convenience but generally represent directions that are approximately perpendicular to each other in a reference frame. The first and second directional guides may be rollers or stainless steel ball bearings although other materials may be used for the rollers, for example wear resistant or low friction plastics such as Acetyl, Nylon, or other materials known in the art.

As shown, the pallet (10) includes the first directional guides (20A, 20B and 22) that may interact and abut against the conveyor system's (100) side rails (102) in order to move the pallet (10) through a pre-determined path. It will be understood that the side rails (102) may be the conveyor system's (100) barrier or edge guides depending on the construction of the conveyor system (100). Conventional conveyor systems (100) may have at least one side rail (102), and may typically have two side rails that would be designed to be on either side of a conveyor pallet.

The first directional guides consist of at least two extended vertical guides, preferably near the corners of the pallet (10). In some cases, there will be four extended vertical guides located in proximity to each corner of the pallet (10). These guides are intended to be elongated or extend above the height of a first side rail (102). Preferably, the guides will include a lower guide (20A) at the level of the side rail (102) and an upper guide (20B) at the height of a diverter rail (103). The vertical guides may be, for example, a single elongated guide, two separate guides on the same vertical axis, as illustrated, or two separate guides located adjacent to each other. When the pallet reaches a conveyor system divert or separation gate that relies upon two stacked and moving side rails (102, 103), the upper guide (20B) may interact with this second higher side rail (103) and guide the pallet (10) through the divert or separation gate. The upper guide (20B) is intended to maintain greater pallet stability than a pallet without an upper guide (20B). In some case, if the conveyor system has multiple diver rails, the guides may be extended or may include a plurality of upper guides (20B).

The first directional guides may further include vertical middle guides (22) at the level of the first side rail (102) and located between the extended vertical guides. In one case, the vertical middle guides are located in the center of the extended vertical guides. The middle guides (22) and lower guides (20A) may aid to guide the pallet (10) through the various sections of the conveyor system (100). The guiding system for the pallet (10) further includes second directional guides or horizontal guides (24) that may be adapted to interact and abut against a bottom or underside of the conveyor side rail (102). The vertical guides (20A and 22) located at the level of the first side rail (102) may help to keep the pallet (10) on a central axis through the radius of a turn while the horizontal guide (24) may aid in preventing the pallet (10) from tipping or slipping during the turning and traveling along the conveyor system (100). At least one horizontal guide (24) may be installed at either side of the pallet (10) to control the direction of the pallet through radius corners to counteract shingling or jamming of pucks while rotating. For example, as shown in most detail in FIG. 5, two horizontal guides (24) are included on each side of the pallet (10), which are intended to improve the balance compared to a conventional pallet.

Each of the guides in the guiding system may be secured with a fastener to the pallet (10) or wear plate (14). The extended vertical guides consisting of upper and lower guides (20A and 20B) may be attached to the wear plate (14) with vertical fasteners (26), while the middle guide (22) may be attached to at least one roller fastener (28) directly through the pallet body (11). The roller fastener (28) may be held in place by a self-locking nut (30). Second directional guides (24) may be attached via a horizontal roller pin and snap ring (32). Other fasteners are contemplated and may include bolts, integral plastic snaps, speed-nuts, and the like.

As a whole, the guiding system (with first and second directional guides) interacts with and abuts against the conveyor's side rails (102) in order to ensure that the pallet moves in a pre-defined path, while intending to reduce or negate the ability spin, roll-over or jamb. Defined movement of the pallet can be frictional or driven by a conveyor system (100).

The guiding system, shown in FIGS. 1 to 5 as vertical guides (20A, 20B and 22) and horizontal guides (24), help control the conveyor pallets (10) in linear and radial travel directions. The pallet (10) may be generic in nature insofar as the pallet can be adapted for many applications where a conveyor-driven base pallet is required to support tooling, fixtures, parts or such.

In one embodiment, the pallet (10) design is such that only free running wear resistant guides (20A, 20B, 24 and 22), such as rollers or precision bearings, and wear resistant (e.g. hardened steel) wear plates (14) touch the conveyor system elements. By using rollers within the guiding system, the guiding system may eliminate or reduce rubbing and reduce the creation of particulate matter that may damage a clean environment. This feature may be particularly useful in clean-room applications where particulate creation can be a concern if rubbing occurs. The pallet (10) may be configured to have no contact rubbing faces or edges and may be accelerated/decelerated rapidly and move at relatively high velocities while remaining controlled and stable. If manufactured with a suitable thermoplastic or thermoset body and stainless steel hardware the pallet (10) may be used in clean-room medical (or similar) environments.

While conveying a part, product, nest or fixture with high, off-center or inclined center(s) of gravity, this conveyor pallet (10) may remain freely mobile, but horizontally stable, when subjected to sudden acceleration, deceleration and radial forces. The pallet (10) is not only limited to carry products or loads with high, off-center or inclined center(s) of gravity and may be employed carrying stable and/or balanced loads.

As mentioned previously, FIGS. 1 to 3 illustrate the datuming features including, a plurality of apertures that may extend throughout the body (11) of the pallet (10) and the wear plates (14). A plurality of mounting apertures (18) may be generally positioned where required. In one example, the mounting apertures (18) may be provided near the corners of the pallet body (11). Other locations are contemplated and the number and location of mounting apertures may vary depending on a fixture or component (not shown) that will be mounted to the pallet. The mounting apertures (18) may be designed to accept hardware for mounting nests, fixtures and other conveying parts and sub-assemblies to transport products. The wear plate (14) may function as a nut for the mounting apertures (18).

The wear plates (14) may further provide positioning apertures (16A and 16B) including a fail-safe feature of positioning aperture (16A). The positioning apertures (16A and 16B) may be larger than the mounting apertures (18). The fail-safe feature of positioning aperture (16A) may consist of a dual diameter aperture adapted to engage a dual diameter dowel of a fixture that may be mounted to the pallet (10). The fixture may comprise of a plurality of dowels with just one dowel, preferably the front center dowel, having a dual diameter. This fail-safe feature of positioning aperture (16A) may ensure that the fixture is mounted to the pallet (10) in the correct orientation.

The positioning apertures (16A and 16B) may be used to pre-locate the pallets (10) from the underside of the pallet (10) when the pallet (10) is positioned on the conveyor belt (100). The pallets (10) may be positioned from the bottom, where shot pins (not shown) may lift and accurately engage the pallet (10) in a desired orientation when it is desirable to remove the pallet (10) from the conveyor (100).

Further, the pallet (10) may contain central positioning aperture (34). The central positing aperture (34) is designed to help the position of the pallet (10) from the bottom, when it is at a stage to be lifted by the shot pins (not shown). Once shot pins have engaged the central positioning aperture (34), the pallet (10) may be axially rotated.

The pallet (10) may further contain bumpers (36), which may be located at the ends oriented in the direction of travel of the pallet (10). The bumpers (36) may act as shock absorbers against stops, or against other pallets. As shown in FIGS. 1 to 5, the bumpers (36) are replaceable thermo-plastic compliant bumpers, which may be pressed into place from the top of the pallet (10). Other material for the bumper may be used; preferably the material should be a shock absorbing material with good memory characteristics. The ends of the pallet, in the direction of conveyor travel, may be radially profiled to present a semi-conjugate action between abutting pallets through turns. This radial profile may also reduce the potential for particulate creation. The pitch or distance between the pallets (10) may be altered based on the bumper size.

The pallet may be fitted with electronic sensor (38) or switch flags for positional, counting and other intelligence control. The sensor (38) may provide a way to detect a particular pallet's position on a conveyor system and may be used at stops and for counting. The pallet may also be fitted with radio frequency identification (RFID) devices for positional data control and collection.

The pallet (10) may also include projections on either side of the pallet. The projections, as shown in FIGS. 1 to 3 may be vertical projections (40). The vertical projections may protect the horizontal guides (24) and may further allow the pallet (10) to be staked in a single orientation when off the conveyor system (100). By providing different number of projections (40) on one side of the pallet (10) than on the other side, the orientation and alignment of the pallets (10) may be quickly reviewed to ensure that all pallets are directed in a single orientation. The different number of vertical projections on either side of the pallet (10) may provide a further fail-safe feature to prevent pallets from being incorrectly oriented when being loaded.

As shown in FIGS. 1 and 2 the pallet (10) may also include at least one depression (42) at the top of the pallet, preferably near the center guide (22). The depressions (18) may be adapted to receiving a clamping mechanism in off-conveyor system stations (not shown). This optional feature may be included in the pallet mold and may reduce the wear on the external surfaces of the body (11) of the pallet (10). The illustrations shown here are generic in nature and if these depressions (18) are desirable they may be designed to suit a specific clamping system, jaws or other gripper.

In the preceding description, for purposes of explanation, numerous details are set forth in order to provide a thorough understanding of the embodiments. However, it will be apparent to one skilled in the art that these specific details may not be required in order to practice the embodiments. In other instances, some structures may be shown in simplified or block diagram form in order not to obscure the embodiments.

The above-described embodiments are intended to be examples only. Those of skill in the art can effect alterations, modifications and variations to the particular embodiments without departing from the scope, which is defined solely by the claims appended hereto.

I claim:

1. A conveyor system pallet comprising:
   a pallet body having a top, a bottom, front and back ends, and sides; and
   a guiding system operatively attached to the pallet body and designed to abut against at least one side rail of a conveyor system, the guiding system comprising:
   a plurality of first directional guides; and
   a plurality of second directional guides oriented approximately orthogonally to the first directional guides, wherein the plurality of second directional guides are located on at least one of the sides of the pallet body and project above the top of the pallet body and are configured to engage an underside of the at least one side rail of the conveyor system.

2. The conveyor system pallet of claim 1 wherein the plurality of first directional guides are vertically oriented guides and the plurality of second directional guides are horizontally oriented guides.

3. The conveyor system pallet of claim 1, wherein the plurality of first directional guides comprise at least one guide designed to abut against a second side rail located above the at least one side rail of the conveyor system.

4. The conveyor system pallet of claim 1, wherein the plurality of first directional guides further comprises at least one middle guide.

5. The conveyor system pallet of claim 1 further comprising a plurality of vertical projections on either side of each second directional guide wherein one side of the conveyor system pallet contains a greater number of vertical projections than the other side.

6. The conveyor system pallet of claim 1, wherein the first and second directional guides are rollers.

7. The conveyor system pallet of claim 1, wherein the first and second directional guides are steel bearings.

8. The conveyor system pallet of claim 1, wherein the pallet body comprises a plurality of datum features designed to engage a pallet fixture.

9. The conveyor system pallet of claim 1 wherein the pallet body further comprises:
   at least one wear plate located on the bottom of the pallet body; and
   a plurality of ribs a fixed height from the at least one wear plate.

10. The conveyor system pallet of claim 1 further comprising at least one bumper connected to at least one end oriented in a travel direction of the conveyor system pallet.

11. The conveyor system pallet of claim 1 wherein the top of the pallet body further contains at least one depression adapted to receive a clamping mechanism.

* * * * *